United States Patent [19]
Haskell et al.

[11] Patent Number: 5,890,120
[45] Date of Patent: Mar. 30, 1999

[54] MATCHING, SYNCHRONIZATION, AND SUPERPOSITION ON ORGINAL SPEAKING SUBJECT IMAGES OF MODIFIED SIGNS FROM SIGN LANGUAGE DATABASE CORRESPONDING TO RECOGNIZED SPEECH SEGMENTS

[75] Inventors: Barin Geoffry Haskell, Tinton Falls; Cassandra Turner Swain, Aberdeen, both of N.J.

[73] Assignee: AT&T Corp, Middletown, N.J.

[21] Appl. No.: 858,966

[22] Filed: May 20, 1997

[51] Int. Cl.$^6$ .............................. G09B 21/04; G10L 5/00
[52] U.S. Cl. ........................................... 704/271; 704/235
[58] Field of Search ..................................... 704/235, 271

[56] References Cited

U.S. PATENT DOCUMENTS

| | | | |
|---|---|---|---|
| 5,544,050 | 8/1996 | Abe et al. | 707/532 |
| 5,659,764 | 8/1997 | Sakiyama et al. | 704/3 |
| 5,734,923 | 3/1998 | Sagawa et al. | 345/302 |

FOREIGN PATENT DOCUMENTS

| | | | |
|---|---|---|---|
| 658854 A2 | 6/1995 | European Pat. Off. | G06F 17/28 |

OTHER PUBLICATIONS

D. Pearson, "Visual Communication Systems for the Deaf," IEEE Transaction on Communications, vol. Com–29, No. 12, pp. 1986–1992 (Dec., 1981).

G. Sperling, "Video Transmission of American Sign Language and Finger Spelling: Present and Projected Bandwidth Requirements," IEEE Transaction on Communications, vol. Com. 29, No. 12, pp. 1993–2002 (Dec., 1981).

M.W. Whybray et al., "A DSP Based Videophone for the Hearing Impaired Using Valledge Processed Pictures," Proceedings of IEEE Conference on Acoustics, Speech, and Signal Processing, pp. 1866–1869 (1989).

J. Xu et al., "A Method For Synthesizing Animation to Transmit Sign Language By Intelligent Communication," Electronics and Communications in Japan, Part 3, vol. 76, No. 2, pp. 108–117 (Feb., 1993).

E. Ohira et al., "A Segmentation Method For Sign Language Recognition," IEICE Transactions on Information and Systems, vol. E78–D, No. 1 (Jan., 1995).

T. Starner et al., "Real–Time American Sign Lanaguage Recognition From Video Using Hidden Markov Models," proceedings of the International symposium on Computer Vision, pp. 265–270 (1995).

M. Waldron et al., "Parsing Method For Signed Telecommunication," IEEE Engineering In medicine & Biology Society 11th Annual International Conference, pp. 1789–1799 (1989).

A. Downton et al., "Image Analysis for Model–Based Sign Language Coding," Proceedings of the 6th International Conference of Image Analysis & Processing, pp. 637–644 (1992).

Primary Examiner—David R. Hudspeth
Assistant Examiner—Talivaldis Ivars Šmits

[57] ABSTRACT

A synthesized signing image is generated which includes an original image of a subject and a sign image superimposed on the original subject image. The sign image is selected from a sign language database based on the speech (i.e., a letter or word) spoken by the subject. Based on the size and tone (intensity) of the subject's face in the original image, the database sign image is modified to match the intensity and have a proportional size to the subject's face. The modified database sign image is then superimposed on the original image of the subject to create a synthesized image in which the subject appears to be signing.

22 Claims, 6 Drawing Sheets

MATCHING, SYNCHRONIZATION, AND SUPERPOSITION ON ORGINAL SPEAKING SUBJECT IMAGES OF MODIFIED SIGNS FROM SIGN LANGUAGE DATABASE CORRESPONDING TO RECOGNIZED SPEECH SEGMENTS

BACKGROUND

The present invention relates to image processing, and more particularly to segmentation and sign language synthesis for facilitating communication between hearing and deaf individuals.

Sign language, an important form of communication for deaf individuals, is not normally understood by hearing individuals. An important question is how to facilitate communication between the two groups, particularly through visual communication technology. Research has been conducted in methods for coding and transmitting signing images across telephone lines. Examples of this type of work include D. Pearson, "Visual Communication Systems For The Deaf," IEEE Transaction On Communications, vol. Com-29, no. 12, pp. 1986–1992 (December, 1981), and G. Sperling, "Video Transmission of American Sign Language and Finger Spelling: Present and Projected Bandwidth Requirements," IEEE Transaction On Communications, vol. Com-29, no. 12, pp. 1993–2002 (December, 1981). Methods have ranged from transmitting hand outlines, such as described in M. W. Whybray et al., "A DSP Based Videophone For the Hearing Impaired Using Valledge Processed Pictures," Proceedings of IEEE Conference on Acoustics, Speech, and Signal Processing, pp. 1866–1869 (1989), to transmitting signing motion parameters, an example described in J. Xu et al., "A Method For Synthesizing Animation to Transmit Sign Language By Intelligent Communication," Electronics and Communications in Japan, Part 3, vol. 76, no. 2, pp. 108–117 (February, 1993). Other research has focused on processing at the receiver, such as sign language recognition and synthesis. Articles which discuss sign language recognition include E. Ohira et al., "A Segmentation Method For Sign Language Recognition," IEICE Transactions On Information and Systems, vol E78-D, no. 1 (January, 1995) and T. Starner et al., "RealTime American Sign Language Recognition From Video Using Hidden Markov Models," Proceedings of the International Symposium on Computer Vision, pp. 265–270 (1995). Articles which discuss synthesis include M. Waldron et al., "Parsing Method For Signed Telecommunication," IEEE Engineering In Medicine & Biology Society 11th Annual International Conference, pp. 1798–1799 (1989), and A. Downton et al., "Image Analysis For Model-Based Sign Language Coding," Proceedings of the 6th International Conference of Image Analysis & Processing, pp. 637–644 (1992). The problem with the synthesis approaches has been their complexity, i.e., they are based on complex graphics which require high CPU processing times.

Therefore, there exists a need for a less complex approach to allow deaf and hearing individuals to communicate.

SUMMARY OF THE INVENTION

The present invention overcomes the disadvantages and drawbacks of the prior art by providing a system for sign language synthesis that is simpler and easier to implement.

The present invention is directed to an apparatus and method for generating a synthesized signing image that includes an original image of a human subject and a pair of signing hands superimposed on the original subject image.

A sign language database is created by manually signing each sign and capturing the sign using a camera. An original image of a subject is obtained and stored in memory. The corresponding speech (letter or word) spoken by the subject is analyzed to identify the database sign image corresponding to the spoken speech segment. The subject's face is segmented in the original image. A size modification factor is calculated which indicates the amount the sign image should be zoomed (enlarged) or dezoomed (decreased in size) to be proportional to the size of the subject's face. Intensity modification information is also calculated which indicates the amount the intensity of the sign image should be modified to match the intensity of the subject's face in the original image. The sign image is then modified to be proportional in size and to match the intensity of the subject's face. The scaled, intensity-modified sign image is then superimposed on the original image to create a synthesized image in which the subject appears to be signing.

An embodiment of the present invention includes a sign language encoding system and a sign language decoding system.

The encoding system includes a microphone for receiving speech signals, and a camera for capturing video images of the subject. The encoding system also includes a speech analyzer for 1)converting the spoken speech into text; and 2)identifying the sign image or images which correspond to the letter or word(s) in the text. An image processor calculates a size modification factor and intensity modification information for the sign image. A digital data encoder generates a bit stream including the digitized original image, the sign image code, the size modification factor and the intensity modification information. The digitized audio from the subject can also be encoded. The bit stream is then transmitted over a transmission medium to a sign language decoding system.

An embodiment of the sign language decoding system includes a decoder for separating the received bit stream into the different signal components. The digitized audio is output to a speaker, and the digitized video of the original image (i.e., a bit mapped image) is output to an image processor. The decoder outputs the sign image code, size modification factor and intensity modification information to a CPU. A sign image is selected from the sign language database based on the sign image code. The image processor, under control of the CPU, modifies the size and intensity of the selected database sign image based on the size modification factor and the intensity modification information. The scaled, intensity-modified image is superimposed on the original image to generate a synthesized signing image. The synthesized signing image is output to a display.

In a first alternative embodiment, the size modification factor and intensity modification information are not transmitted with each original image. Rather, the size modification factor and intensity modification information are only transmitted when it becomes necessary to update the size or intensity of the sign image to reflect changes in the original image.

In a second alternative embodiment, the encoding system transmits only the video images of the subject and an identification of the letters or words spoken by the subject. The database sign image corresponding to the letter or word spoken is extracted at the decoding system, modified, and superimposed.

The advantage of this approach is that it is simple and easy to implement. The purpose of the present invention is to facilitate the communication between a hearing individual and a deaf individual. There are numerous applications in which the present invention can be applied. It is desirable to apply the present invention to any video applications, such as video conferencing.

DETAILED DESCRIPTION

Figure 1:
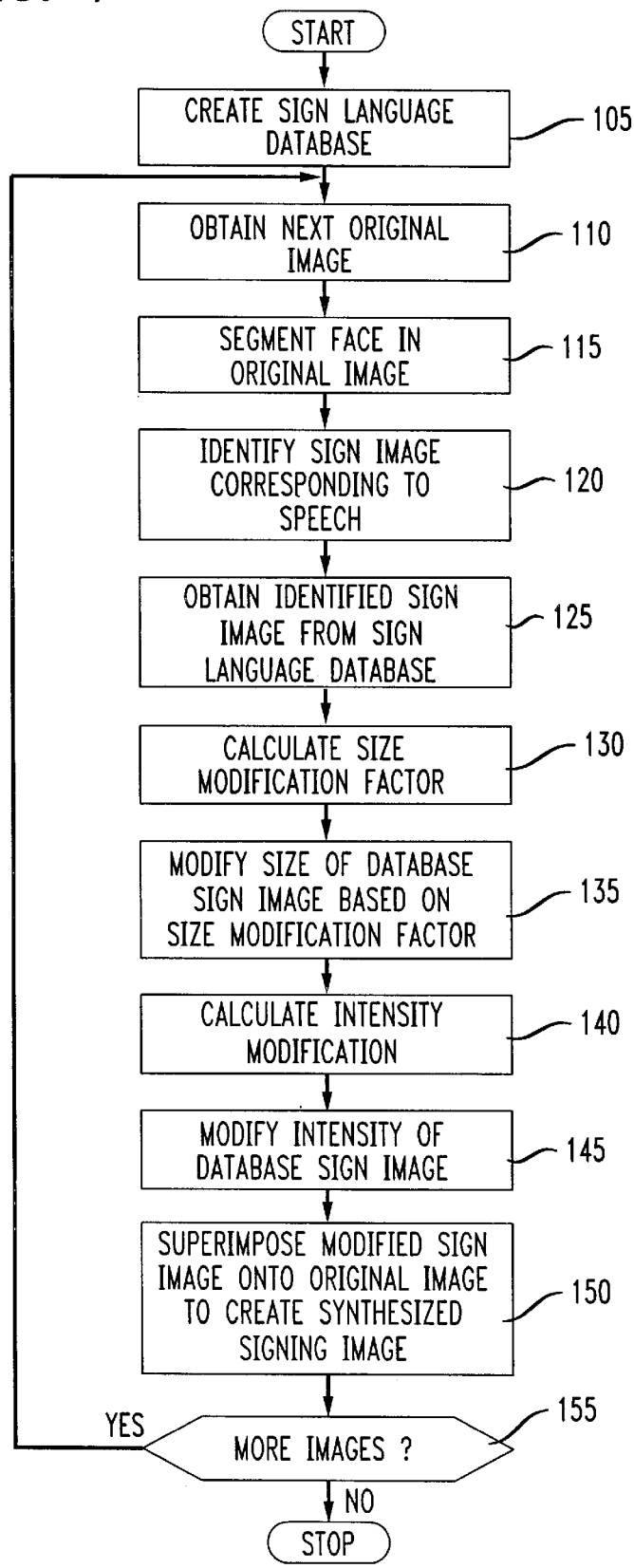
FIG. 1 illustrates a flow chart for segmentation and sign language synthesis according to an embodiment of the present invention.

Referring to the Figures in which like numerals indicate like elements, FIG. 1 illustrates a flow chart for segmentation and sign language synthesis according to an embodiment of the present invention. The present invention is directed to a method for generating a synthesized image that includes an original view of a human subject (for example a head and shoulders view of the subject) and a pair of signing hands superimposed on the original subject image. The sign image is selected from a sign language database based on the speech (i.e., a letter or word) spoken by the human subject. Based on the size and intensity of the subject's face, the database sign image is modified to match the face intensity and to have a size in proportion to the subject's face. The modified database image is then superimposed on the original head and shoulders image of the subject to create a synthesized image in which the subject appears to be signing.

Figure 2:
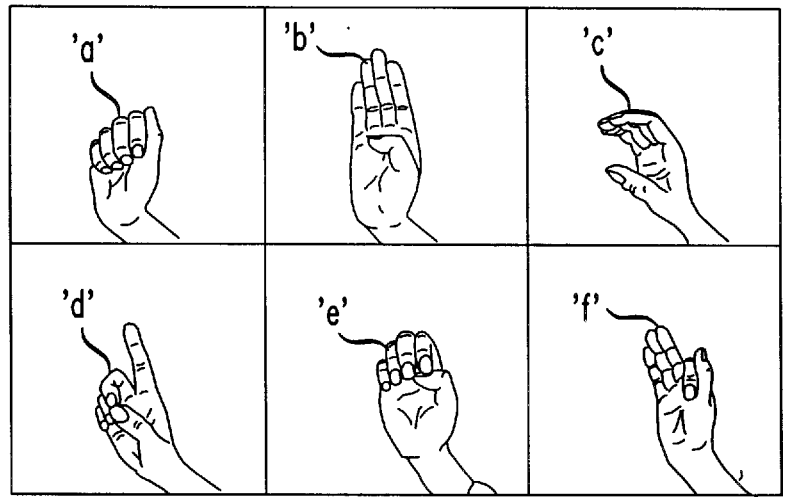
FIG. 2 illustrates sign images stored in the sign language database for the letters 'a'–'f' according to an embodiment of the present invention.

Referring to FIG. 1, in step 105 a sign language database is created for a plurality of speech segments (i.e., for letters, words or other speech segments). FIG. 2 illustrates, by way of example, sign images stored in the sign language database for the letters 'a'–'f.' The sign language database can contain sign images for a plurality of different types of speech segments, including letters, words, groups of words or phrases, etc.

The sign language database can be created by a pair of hands manually signing each letter or word, and using a camera to capture an image of the signing hands. Each sign image is then digitized (if not already in digital form) to create a bit-mapped image. The hands are segmented from the rest of the image based on the intensity of the hands. Each of the digital sign images is then stored in memory with a corresponding sign image code identifying the sign image. For example, each of the sign images of the letters 'a'–'z' can be stored in memory with a corresponding eight bit code which uniquely identifies the sign image.

In step 110, an original image of a human subject who is speaking is acquired and stored in memory. This original image can be a head and shoulders view of the subject. A video camera, for example, can be used to obtain a video signal of the subject. The video signal can be periodically sampled and stored in memory to acquire a plurality of images of the subject (which can be in the form of a bit mapped image).

In step 115 the face of the human subject is segmented in the original image. The face tone or intensity of the subject is usually different from the rest of the image. Therefore, the face can be segmented based on its intensity. In one embodiment, the face of the subject may be segmented based on a histogram analysis of the image. A histogram analysis indicates the number of pixels at each pixel value or intensity. Based on experimentation, a narrow range of pixel intensities may be identified as corresponding to the skin tone of the subject. Pixels in the original image within this range are the face of the human subject. A segmentation map can be generated identifying the location and boundaries of the subject's face in the original image. A segmentation map can be, for example, a binary image in which the object (the subject's face) is white (i.e., a pixel value of 255 for an eight bit pixel value), and all else is black.

In addition, a morphological filter can be used for initially grouping segmented pixels together. This filter can be useful for two reasons. First, the morphological filter eliminates any single stray lines or pixels within the segmented image due to noise. Second, the filter grows or enlarges regions to fill any gaps in the segmented object.

In step 120, the sign image is identified which corresponds to the speech (i.e., a letter, word or group of words) spoken by the human subject in the original image obtained in step 110. In one particular embodiment, step 120 involves two parts: 1) converting the spoken speech into text; and 2) identifying the sign image or images which correspond to the letter or word(s) in the text. Other techniques can be used.

Several available techniques may be used to convert the speech into text. In one embodiment, a well known automatic speech recognition system (or a speech-to-text system) is used to identify the letters or words spoken by the human subject. An automatic speech recognition system analyzes a speech signal and produces a textual representation of the speech signal. Speech recognition systems use a combination of pattern recognition and sophisticated guessing based on some linguistic and contextual knowledge.

Several techniques may also be used to identify the sign image or images which correspond to the letter or word(s) in the text. In one particular embodiment, a lookup table or the like can be used to identify the sign image code which corresponds to the word or letter of the text. As discussed in connection with step 105, each sign image code identifies a sign image stored in the sign language database.

Because the speech segment processed at step 120 corresponds to the original image of the subject obtained at step 110 (i.e., the speech was said by the subject while the image was captured), the sign images identified at step 120 will be synchronized with each original image obtained at step 110. This synchronization between the identified sign images and each of the original images allows the proper coordination and timing between the sign images and the original images when creating the synthesized signing images.

In step 125, a copy of the database sign image identified in step 120 is obtained from the sign language database. In other words, the identified database sign image is copied into memory (such as random access memory or RAM) for further processing.

In step 130, a size modification factor ($S_m$) is calculated. For a natural looking synthesized signing image, the face and hands must be proportional. Because the original and database images are acquired separately, with different camera settings, angles, distances, and from different subjects, the size of the sign image (i.e., the size of the signing hands) stored in the sign language database may not be proportional to the size of the face in the original image. As a result, it may be necessary to scale the database sign image before superimposing it on the original image. Scaling the sign image involves zooming (enlarging) or dezooming (reducing) the sign image. The size modification factor ($S_m$) indicates the amount which the sign image should be zoomed or dezoomed to make the signing hands proportional to the subject's face in the original image.

To calculate the size modification factor, first the relative size of the subject's face in the original image ($s_o$) is calculated based on the following equation:

$$s_o = \frac{\Sigma i}{\Sigma g},$$

where $\Sigma i$ is the number of face pixels in the original image, $\Sigma g$ is the total number of pixels in the original image, and $s_o$ is the relative size of the subject's face in the original image. $s_o$ is normalized based on the total number of pixels in the original image.

The relative size of the hands in the database sign image ($S_{db}$) should also be calculated based on the following equation:

$$s_{db} = \frac{\Sigma i}{\Sigma g},$$

where $\Sigma i$ is the number of hand pixels in the database sign image, and $\Sigma g$ is the total number of pixels in the database sign image. Therefore, it can be seen that $S_{db}$ is normalized based on the total number of pixels in the image.

For a natural looking synthesized signing image, the ratio of the size of the face in the original image ($s_o$) to the size of the hands in the database image ($S_{db}$) should be equal to a proportionality constant ($k_b$), as shown in the following equation:

$$k_b = \frac{s_o}{s_{db}}.$$

For a natural looking synthesis image, the proportionality constant ($k_b$) should be in the range 1.4–1.8, and ideally, should be approximately 1.6. Other values can also be used.

Because the database sign image may not be in a proper proportion to the original image to satisfy the above equation, the database sign image may need to be zoomed or dezoomed. A size modification factor ($s_m$) can be calculated based on the following equation in order to maintain the proportionality constant:

$$k_b = \frac{s_o}{s_m s_{db}},$$

The size modification factor ($s_m$) indicates the amount which the database image should be scaled (either zoomed or dezoomed). For example, a size modification factor of 0.8 will reduce the database sign image to 80% of its original size, while a size modification factor of 1.5 will increase the size of the database sign image to 150% of its original size. A size modification factor equal to one indicates that the database sign image and the original image are in proper proportion, and no modification is necessary. A size modification factor greater than one indicates that the database image should be enlarged (a zoom operation), while a size modification factor less than one indicates that the database image should be reduced in size (or dezoomed).

In step 135 of FIG. 1, the size of the database sign image is modified (zoomed or dezoomed) based on the size modification factor calculated in step 130. If the size modification factor is equal to one, then no modification is performed.

The sign image can be zoomed by supersampling the image. Using this technique, each pixel in the sign image is duplicated one or more times to increase the size of the sign image.

The sign image can be dezoomed or decreased in size by sub-sampling the sign image. Using this technique, a plurality of pixels in the sign image are sampled and replaced with a single pixel. For example, every third pixel in the sign image can be duplicated in the dezoomed image (deleting the other two pixels), or every three pixels can be averaged to obtain a single pixel value to replace the three pixels.

The following algorithm or code can be used for the zoom/dezoom operation according to an embodiment of the present invention:

$s_m$=1.2; (in this example, size modification factor is set to 1.2)

```
2    for (i=x; i<x+sizeX; ++i)
3    {
4        for (j=y; j<y+sizeY; ++j)
5        {
6            for (k=0.0; k<s_m; k+=1.0);
7                For (L=0.0, L<s_m; L+=1.0); (for horizontal
8                    and vertical space to be scaled)
9                {
10                    if ((int) segmentMap[i] [j]==255)
11                        ScaledImage [(int) (m+k)] [(int) (n+L)]=
12                            OldImage[i] [j];
13                }
14            n+=s_m; (move to the next horizontal position
15                in scaled image; repeat scaling.)
16            }
17            m+=s_m; n=0.0;
18        }   (move to next vertical position in scaled
19            image; repeat scaling).
```

The above algorithm provides one embodiment for supersampling or sub-sampling the hands in the sign image, depending on whether $s_m$ is greater than one (for zoom operation) or less than one (for dezoom). The unscaled database sign image (OldImage) is of size (sizeX, sizeY). The hands in the unscaled sign image, which will be zoomed by 20% ($s_m$=1.2) in this example, are identified by the segmentation map (segmentMap). The hands in the database sign image are white (pixel value of 255) in the segmentation map, and all else in the segmentation map is black. In lines 10–12 of the above algorithm, if pixel i,j is part of the hands to be zoomed, then pixel i,j is copied to location m+k, n+1 in the scaled image (ScaledImage). The pixel i,j in the unscaled sign image is copied "$s_m$" times vertically and horizontally in the scaled image. Other techniques can be used to zoom or dezoom the hands.

In step 140 of FIG. 1, an intensity modification is calculated. For a natural looking synthesis signing image, the intensity of the signing hands (from the database image) should match the intensity of the subject's face. However, varying camera settings, lighting and different subjects usually prevent a proper match in intensity between the two images. Therefore, the intensity of the database image (the signing hands) must be modified to match the intensity of the subject's face. However, as shown in FIG. 2, the hands in the database sign images have varying intensities which indicate creases, bends and other features of the hands which identify the positions and shape of the hands. Therefore, when modifying the intensity of the hands in the sign image, it is desirable to maintain the varying intensities within the signing hands.

To calculate the intensity modification, first the average intensities $I_{db}$ and $I_o$ of the scaled database image and the original image, respectively, will be calculated using the following equation:

$$I = \frac{\Sigma\Sigma o(x,y)}{\Sigma i}$$

where $o(x,y)$ is the intensity of the hand pixels (for the database sign image) or the face pixels (for the original image), and $\Sigma i$ is the total number of hand pixels (for the database image) or the total number of face pixels (for the original image).

Next a difference map $m(x,y)$ is generated for the scaled database image, such that:

$$m(x,y)=d_s(x,y)-I_{db}.$$

where $d_s(x,y)$ is the scaled database image. The difference map is a map of pixel values that indicates the variation (either a positive or negative number) of each pixel in the scaled database image from the average pixel value or intensity ($I_{db}$) of the scaled database image.

In step 145, the intensity of the scaled database image is modified. According to one embodiment, the average intensity of the original image ($I_o$) is added to each value in the difference map to generate the intensity-modified database image $d_i(x,y)$ based on the following equation:

$$d_i(x,y)=m(x,y)+I_o.$$

The result is a scaled, intensity-modified image that matches the proportional size and intensity of the subject's face in the original image. By using the difference map, the modified image varies in intensity in the same manner as the database image.

In step 150 of FIG. 1, the scaled, intensity-modified sign image is superimposed on the original image to create a synthesized image in which the subject appears to be signing.

In step 155, if there are more images to be processed, flow proceeds back to step 110 to obtain the next image for processing. Otherwise, the process terminates.

Figure 3:
FIG. 3 illustrates synthesized signing images for two different subjects according to an embodiment of the present invention.

FIG. 3 illustrates synthesized images for two different subjects. The images of FIG. 3 show both subjects signing the letters 'b,' 'c' and 'd.' The two subjects in FIG. 3 have different skin tones and face sizes. The subject in the lower set of images of FIG. 3 has a larger face with a darker skin tone. For each of the subjects, sign images were selected from the sign image database (illustrated, for example, in FIG. 2) modified in size and intensity to match the subject's face, and then superimposed on the original image of the subject to provide synthesized images in which the subject is signing. The sign images are outlined in white in FIG. 3 to highlight the sign images.

Figure 4:
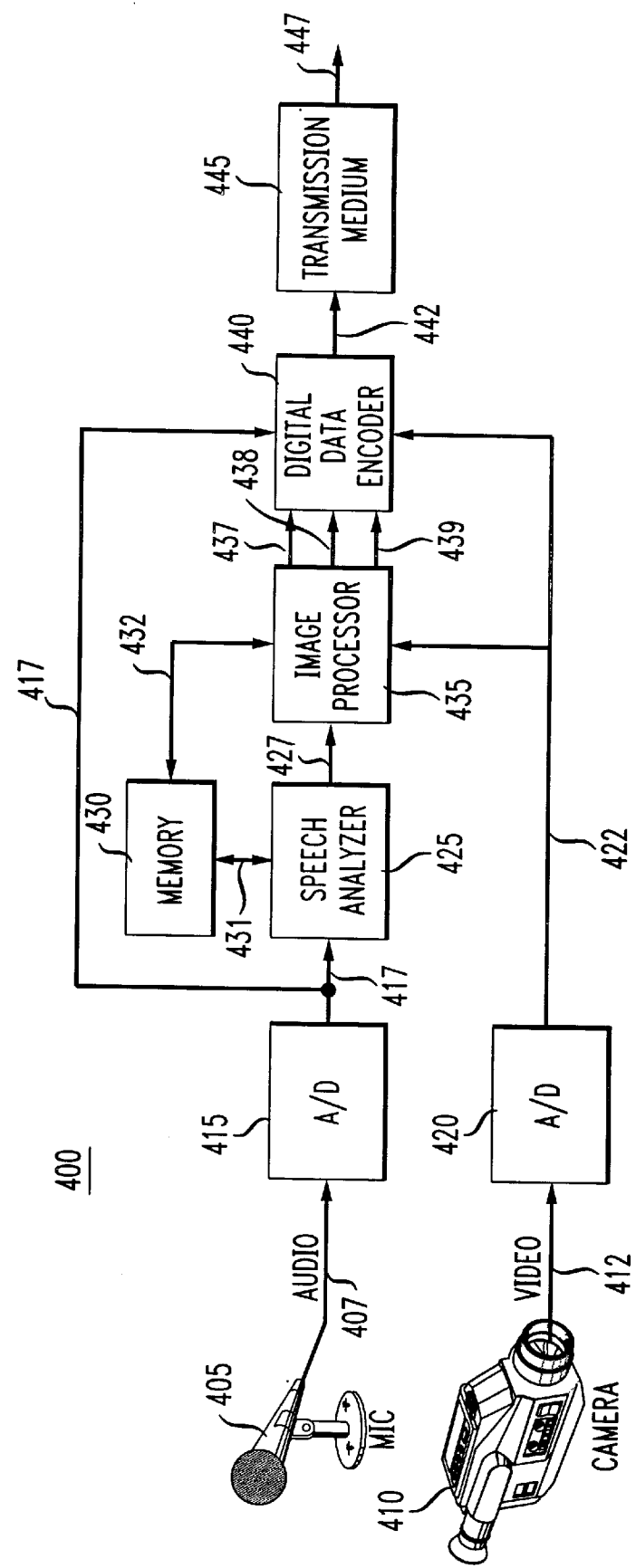
FIG. 4 illustrates a block diagram of a sign language encoding system according to an embodiment of the present invention.

FIG. 4 illustrates a block diagram of a sign language encoding system according to an embodiment of the present invention. Encoding system 400 receives audio and video signals from a non-signing subject (original image) and generates a digital signal which includes audio and video information of the subject, one or more sign image codes identifying sign images, a size modification factor and intensity modification information.

Encoding system 400 includes a microphone (mic) 405 for receiving an audio signal from a human subject and a camera 410 for obtaining video images of the subject. Mic 405 outputs an audio signal on line 407, and camera 410 outputs a video signal on line 412.

Analog-to-digital (A/D) converters 415 and 420 are coupled to mic 405 and camera 410 respectively for converting analog signals into digital signals (i.e., digitized speech and bit mapped video signals, respectively).

Encoding system 400 also includes a speech analyzer 425 coupled to A/D converters 415 and 420 for analyzing digitized speech signals to identify sign images corresponding to the received digitized speech signals. A memory 430 is coupled to speech analyzer 425 and stores a sign language database including a plurality of sign images and the corresponding sign image codes. An image processor 435 is coupled to memory 430 via line 432 and to speech analyzer 425 via line 427. Image processor 435 is also coupled to A/D converter 420 via line 422. Among other functions, image processor 435 calculates a size modification factor and an intensity modification for each selected sign image. Image processor 435 outputs sign image codes on line 437, size modification factors on line 438 and intensity modification information on line 439.

A digital data encoder 440 is coupled to image processor 435, and A/D converters 415 and 420. Digital data encoder 440 encodes the digitized audio and video signals from lines 417 and 422, respectively, the sign image code(s) received over line 437, the size modification factor(s) received over line 438 and intensity modification information received over line 439 into a digital bit stream.

The digital bit stream is transmitted to another computer or system over a transmission medium 445. Transmission medium 445 can include any transmission medium, such as coaxial cable, fiber optics, twisted pair, wireless communications, etc.

Figure 5:
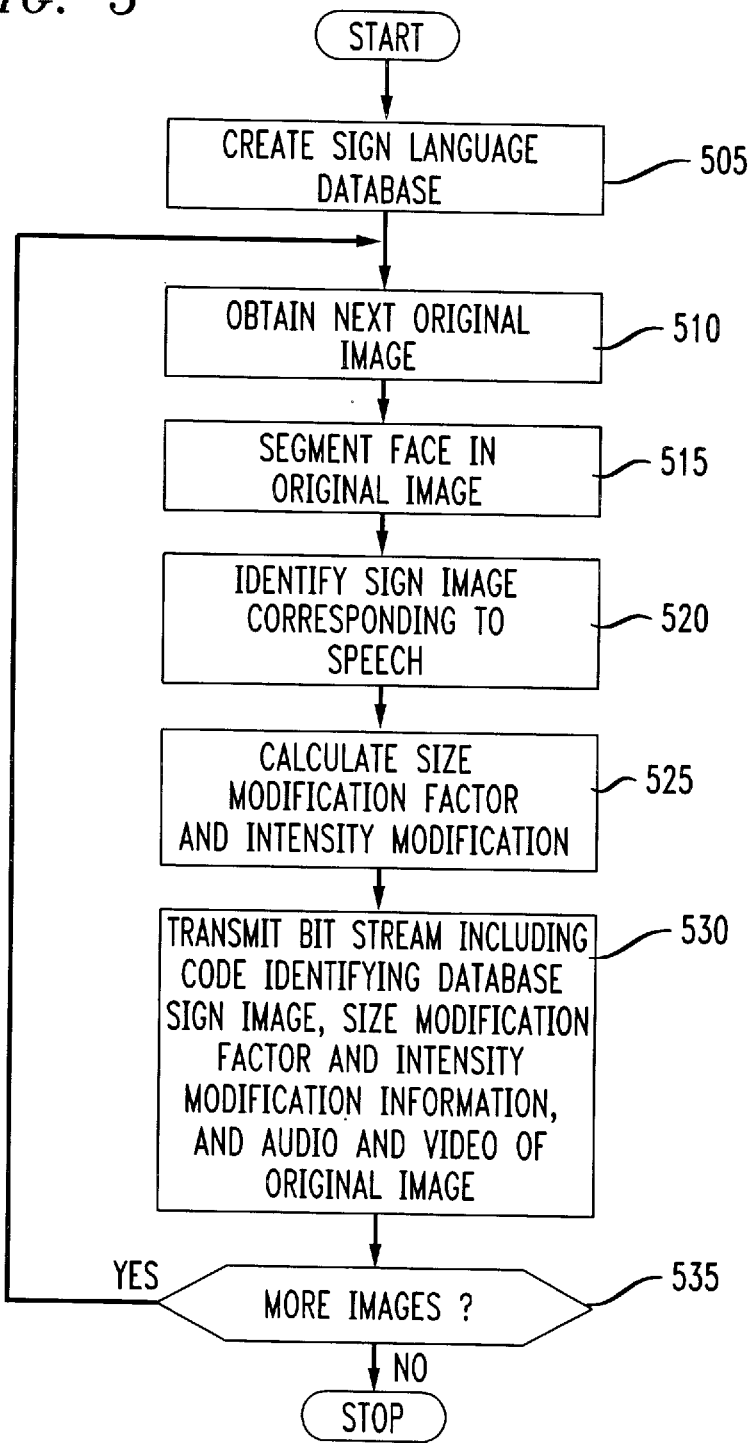
FIG. 5 illustrates a flow chart illustrating the operation of the sign language encoding system of FIG. 4 according to an embodiment of the present invention.

The operation of sign language encoding system 400 according to an embodiment of the present invention will now be described. FIG. 5 illustrates a flow chart illustrating the operation of the sign language encoding system of FIG. 4 according to an embodiment of the present invention.

In step 505, a sign language database is created by manually signing images for each of a plurality of speech segments which are captured by camera 410 and digitized by A/D converter 420. The hands in the digitized signs are segmented from the rest of the image based on intensity by image processor 435. Each of the sign images are stored in memory 430 with a corresponding sign image code which identifies the sign image.

In step 510, camera 410 captures an original image of a subject, for example, during a video teleconference between a deaf person and a hearing person. This image can be a head and shoulders view of the subject.

In step 515, image processor 435 segments the subject's face in the original image from the rest of the image. The original image should not contain the hands of the subject because signing hands will be superimposed on the subject, which would create two pair of hands. If this original image contains the hands of the subject, the hands can be segmented and removed from the image. Like the face, the subject's hands can be segmented based on intensity. The hands can then be distinguished from the face because the hands are a smaller object (less pixels), typically located below the face. As a result, the hands can be identified (segmented) and removed from the original image. Alternatively, the original image can be modified to leave only a head and shoulders view of the subject.

In step 520, mic 405 receives speech from the subject corresponding to the original image of the subject. The speech signal is digitized by A/D converter 415 and provided to speech analyzer 425. Speech analyzer 425 identifies the database sign image (or images) corresponding to the received digitized speech segment(s), and outputs a sign code identifying the sign image on lines 431 and 427.

In step 525 image processor 435 calculates the size modification factor ($S_m$) based on the identified database sign image and the original image stored in memory 430. Image processor also calculates intensity modification information to allow a remote receiving computer to properly modify a database sign image to match the intensity of the subject's face.

Different types of intensity modification information can be calculated at step 525. In one embodiment, image processor 435 calculates the average intensities $I_{db}$ and $I_o$ of the scaled database image and the original image, respectively, as the intensity modification information. Any type of intensity modification information can be calculated which would allow a computer or system to modify the intensity of an image.

At step 530, encoder 440 encodes a plurality of signals into a bit stream for transmission over medium 445. Encoder 440 encodes the audio and video of the subject received on lines 417 and 422, respectively, the sign image code received on line 437, the size modification factor received on line 438, and the intensity modification information received on line 439 into a bit stream. The bit stream is then transmitted over transmission medium 445.

At step 535, if there are more images of the subject to be processed, flow proceeds back to step 510. This process continues until all original images have been processed.

Figure 6:
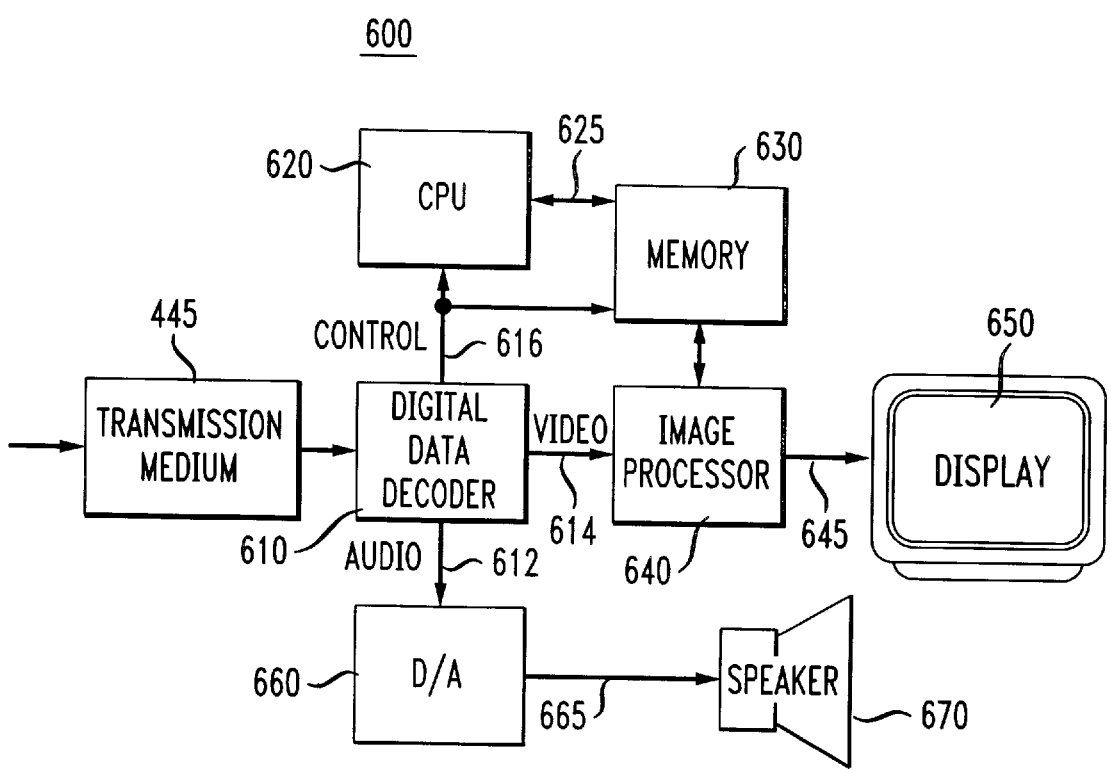
FIG. 6 illustrates a block diagram of a sign language decoding system according to an embodiment of the present invention.

FIG. 6 illustrates a block diagram of a sign language decoding system according to an embodiment of the present invention. Decoding system 600 includes a digital decoder 610 which receives a digital signal over transmission medium 445 via line 447 and decodes or separates the received signal into a plurality of signal components. Digital decoder 610 receives audio, video and control signals over medium 445 and outputs the digitized audio over line 612, the digitized video over line 614, and the remaining signals (including control signals) over line 616. A CPU 620 is coupled to decoder 610 for executing instructions and controlling the operation of decoding system 600. Decoding system 600 also includes an image processor 640 for modifying sign images and superimposing images. A memory 630 is coupled to CPU 620 and image processor 640 for storing a sign language database and other information. A display 650 is coupled to image processor 640 for displaying synthesized signing images generated by image processor 640.

A single computer or system can operate as both encoding system 400 and decoding system 600, thereby allowing two way sign language communication.

Figure 7:
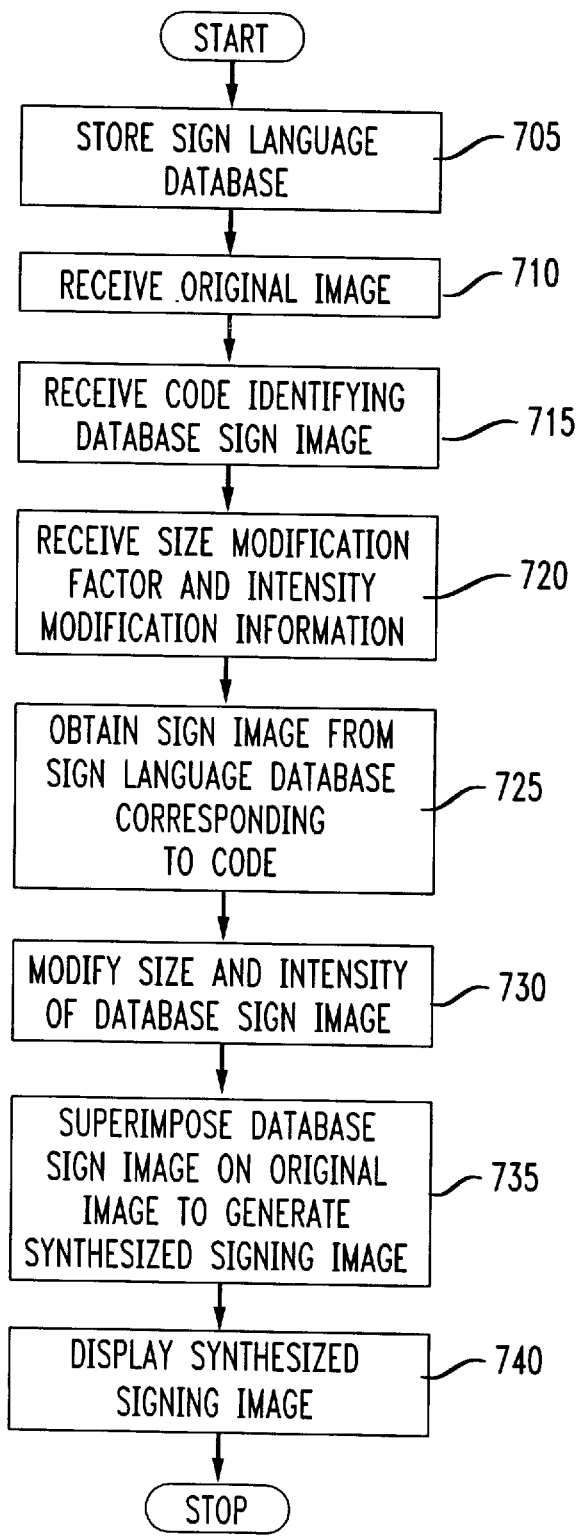
FIG. 7 is a flow chart which illustrates the operation of the sign language decoding system of FIG. 6 according to an embodiment of the present invention.

The operation of encoding system 600 will now be described. FIG. 7 is a flow chart which illustrates the operation of the decoding system of FIG. 6 according to an embodiment of the present invention.

In step 705, the sign language database stored in encoding system 400 is also stored in memory 630 of decoding system 600.

Steps 710, 715 and 720 will now be described. Digital data decoder 610 receives the digital bit stream transmitted by encoding system 400. Decoder 610 decodes or separates the received bit stream into a plurality of signals. Decoder 610 outputs the digitized audio signal of the subject onto line 612, the bit mapped video image of the subject on line 614 (step 710), and the remaining signals on line 616. The remaining signals include the sign image code or codes identifying one or more database sign images (step 715), a size modification factor, and intensity modification information (step 720). In one embodiment, the intensity modification information includes the average intensities $I_{db}$ and $I_o$ of the scaled database image and the original image, respectively.

In step 725, under control of CPU 620, the database sign image identified by the received sign image code (on line 616) is copied in memory 630 for modification.

In step 730, image processor 640 modifies the size of the database sign image (i.e., scales the sign image) based on the size modification factor ($s_m$) received by digital data decoder 610. Next, image processor 640 modifies the intensity of the scaled database sign image to match the intensity of the subject's face. Based on the scaled database image $d_s(x,y)$ and the average intensity of the scaled database image ($I_{db}$), image processor 640 generates a difference map $m(x,y)$ for the scaled database image. Image processor 640 then applies the average intensity of the original image ($I_o$) to the difference map to generate a scaled, intensity-modified image, $d_t(x,y)$, as described above in connection with FIG. 1. The result is a sign image that matches the intensity and proportional size to the subject's face in the original image that was captured by camera 410 in encoding system 400.

In steps 735 and 740, the original image is output on display 650, and the corresponding speech of the subject is output on speaker 670. The scaled, intensity-modified sign image is then superimposed on the original image to display the synthesized signing image on display 650.

This process is repeated for each original image received. For each original image received, one or more sign images are retrieved from memory and modified based on a corresponding size modification factor and intensity modification information. The modified images are superimposed on the original images to generate a synthesized signing image.

Two alternative embodiments will be briefly described.

In a first alternative embodiment, the size modification factor and intensity modification information (image modification information) are not transmitted with each original image. Rather, after sending image modification information with, for example, the first original image in a series of images, image modification information is not retransmitted until it becomes necessary to update the size or intensity of the sign image to reflect changes in the original image.

For example, encoding system 400 can periodically (i.e., every image or every three images) determine whether the size modification factor or the average intensity of the original image has changed. This can occur, for example, if a different person is substituted for the subject, or if camera settings, positions, angles or lighting changes. These types of changes can cause the original images to suddenly increase or decrease in size or change intensity. For example, if the camera moves closer to or farther away from the subject, the subject's face in the original image will suddenly increase or decrease in size, respectively. Decoding system 600 should immediately receive updated image modification information to maintain a natural looking synthesized signing image. In addition, by sending image modification information only in response to a change in the original image, the bandwidth or data rate requirements of the system are advantageously decreased.

In a second alternative embodiment, encoding system 400 transmits only the video images of the subject and an identification of the letters or words spoken by the subject. The database sign image corresponding to the letter or word spoken is extracted at the decoder, modified, and superimposed. Instead of transmitting an identification of the spoken letter or word, an identification of the corresponding sign image can be transmitted. The second alternative embodiment is even simpler and requires less bandwidth than the embodiments described in connection with FIGS. 4–7. While the digitized audio can be transmitted from encoding system 400 to decoding system 600, this is probably unnecessary because the user at decoding system 600 is likely deaf and will rely on the superimposed sign image to understand the words spoken by the subject.

The present invention is directed to a method for generating a synthesized signing image that includes an original image of a subject and a pair of signing hands superimposed on the original subject image. The sign image is selected from a sign language database based on the speech (i.e., a letter or word) spoken by the subject. Based on the size and tone (intensity) of the subject's face, the database sign image is modified to match the face intensity and to have a size in proportion to the subject's face. The modified database image is then superimposed on the original image of the subject to create a synthesized image in which the subject appears to be signing.

The techniques of the present invention are simple and easy to implement. The purpose of the present invention is to facilitate the communication between a hearing individual and a deaf individual. There are numerous applications in which the present invention can be applied. It is desirable to apply the present invention to any of several video applications, such as video conferencing between individuals which may be remotely located. The individuals could communicate, for example, by video teleconferencing over the Internet using their personal computers which have been programmed to perform the functions of the present invention (i.e., identifying the sign image corresponding to spoken letter or word, face segmentation, sign image modification, and superimposing the sign image onto the original image).

The present invention can also be applied to other video applications, such as television. An identification of the spoken letter or words could be transmitted in the vertical blanking interval of an analog television signal or as digital data in a digital television signal. A television receiver, coupled to a computer, receives the video and audio of the original image, and the identification of the spoken letter or words. The television displays the original image, and outputs the audio. The computer selects a database sign image corresponding to the spoken letter or word, modifies the sign image, and superimposes the sign image on the original image to create a synthesized signing image output on the television display. In this manner, a television program can be provided which facilitates communication to deaf individuals through synthesized signing images.

What is claimed is:

1. A method of generating a synthesized signing image comprising the steps of:

storing a sign language database including a sign image corresponding to each of a plurality of speech segments;

obtaining an original image of a subject;

identifying a characteristic of the subject in the original image;

receiving a speech segment spoken by the subject;

identifying one of said database sign images corresponding to the speech segment spoken by the subject;

modifying the identified sign image to match the characteristic of the subject in the original image; and superimposing the modified sign image on the original image of the subject to generate a synthesized signing image.

2. The method of claim 1 wherein said step of storing comprises the steps of:

manually signing each of a plurality of sign images corresponding to speech segments;

capturing each signed image using a camera;

digitizing each captured sign image; and storing each digitized sign image.

3. The method of claim 1 wherein said step of identifying a characteristic comprises the steps of:

segmenting the subject's face in the original image; and calculating a relative size of the subject's face in the original image compared to the rest of the original image.

4. The method of claim 1 wherein said step of identifying a characteristic comprises the steps of:

segmenting the subject's face in the original image; and calculating an average intensity of the subject's face in the original image.

5. The method of claim 1 wherein said step of identifying a characteristic comprises the steps of:

segmenting the subject's face in the original image;

calculating a relative size of the subject's face in the original image compared to the rest of the original image;

calculating a relative size of one or more hands in the identified sign image compared to the rest of the sign image; and calculating a size modification factor indicating the amount which the hands in the identified sign image should be zoomed or dezoomed to be a predetermined proportion to the subject's face in the original image, said size modification factor being calculated based on said relative sizes of the hands and the subject's face.

6. The method of claim 1 wherein said step of identifying a characteristic comprises the steps of:

segmenting the subject's face in the original image;

calculating an average intensity of the subject's face in the original image;

calculating an average intensity of one or more hands in the identified sign image, said sign image comprising a plurality of pixels, each pixel having a corresponding intensity value; and calculating, based on the identified sign image and the average intensities of the hands and the subject's face, a pixel intensity adjustment for each pixel in the identified sign image.

7. The method of claim 1 wherein said step of identifying a characteristic comprises the step of identifying one or more characteristics selected from the group consisting of:

the average intensity of the subject's face in the original image; and the relative size of the subject's face in the original image.

8. The method of claim 7 wherein said step of modifying the identified sign image comprises the step of modifying the average intensity of one or more hands in the identified sign image to approximately match the average intensity of the subject's hands.

9. The method of claim 7 wherein said step of modifying the identified sign image comprises the step of modifying the size of one or more hands in the identified sign image to be proportional in size to the subject's face.

10. The method of claim 1 wherein said step of identifying one of said database sign images comprises the steps of:
   converting the speech segment spoken by the subject into text; and
   identifying one of said database sign images corresponding to the text.

11. The method of claim 10 wherein:
   said step of converting the speech segment comprises the step of identifying a letter spoken by the subject; and
   said step of identifying one of said database sign images comprises the step of identifying a database sign image corresponding to the letter spoken by the subject.

12. The method of claim 10 wherein:
   said step of converting the speech segment comprises the step of identifying one or more words spoken by the subject; and
   said step of identifying one of said database sign images comprises the step of identifying a database sign image corresponding to the one or more words spoken by the subject.

13. A method of generating a synthesized signing image comprising the steps of:
   storing a sign language database including a sign image corresponding to each of a plurality of speech segments, each said sign image comprising one or more signing hands;
   obtaining an original image of a subject, said subject including a face;
   calculating the relative size of the subject's face in the original image;
   calculating the relative size of the one or more hands in the sign image;
   receiving a speech segment spoken by the subject;
   identifying one of said database sign images corresponding to the speech segment spoken by the subject;
   modifying the size of the hands in the identified sign image to be a predetermined proportion to the size of the subject's face in the original image; and
   superimposing the modified sign image on the original image of the subject to generate a synthesized signing image.

14. A method of generating a synthesized signing image comprising the steps of:
   storing a sign language database including a sign image corresponding to each of a plurality of speech segments, each said sign image comprising one or more signing hands having a natural variation in intensity due to the shape of the hands;
   obtaining an original image of a subject, said subject including a face;
   calculating the average intensity of the subject's face;
   calculating the average intensity of the hands in the identified sign image;
   receiving a speech segment spoken by the subject;
   identifying one of said database sign images corresponding to the speech segment spoken by the subject;
   modifying the intensity of the hands in the identified sign image to generally match the intensity of the subject's face in the original image, while maintaining a variation in the intensity of the hands in the modified sign image which is similar to the variation in the intensity of the hands in the database sign image; and
   superimposing the modified sign image on the original image of the subject to generate a synthesized signing image.

15. A method of generating a synthesized signing image comprising the steps of:
   storing a sign language database at both a transmitting system and a receiving system, said sign language database including a sign image corresponding to each of a plurality of speech segments and a sign image code corresponding to each sign image;
   performing the following steps at the transmitter system:
      a) obtaining an original image of a subject;
      receiving a speech segment spoken by the subject;
      b) identifying one of said database sign images corresponding to the speech segment spoken by the subject;
      c) transmitting the original image and the sign image code corresponding to the identified sign image;
   performing the following steps at the receiving system:
      d) receiving the transmitted original image and the sign image code corresponding to the identified sign image;
      e) identifying a characteristic of the subject in the received original image;
      f) modifying the sign image corresponding to the received sign image code to match the characteristic of the subject in the received original image; and
      g) superimposing the modified sign image on the original image of the subject to generate a synthesized signing image.

16. A method of processing an original image to facilitate the generation of a synthesized signing image:
   a) storing a sign language database including a sign image corresponding to each of a plurality of speech segments and a sign image code corresponding to each sign image;
   b) obtaining an original image of a subject;
   c) receiving a speech segment spoken by the subject, said speech segment corresponding to the original image;
   d) identifying one of said database sign images corresponding to the speech segment spoken by the subject;
   e) measuring one or more characteristics of the original image;
   f) measuring one or more characteristics of the identified database sign image;
   g) calculating, based on said measured characteristics of the original image and the sign image, one or more modification parameters indicating the amount which the sign image should be modified to approximately match the one or more measured characteristics of the original image; and
   h) transmitting to a remote location a signal comprising the sign image code corresponding to the identified sign image, the one or more calculated modification parameters, and the original image, thereby to facilitate the generation of a synthesized signing image at the remote location.

17. The method of claim 16 wherein said steps b)–h) are performed for a plurality of original images, said method further comprising the step of determining for each original image whether one or more of the calculated modification parameters have changed as compared to the characteristics of other original images, and said transmitted signal including the calculated modification parameters only if the parameters have changed.

18. The method of claim 16 and further comprising the steps of:

repeating steps b)–e) for each of a plurality of subsequent original images;

comparing the one or more measured characteristics of one of the subsequent original images to the measured charactersitics of an earlier original image;

determining if the one or more characteristics of the subsequent original image have changed based on said step of comparing;

repeating steps f) and g) for the subsequent image if the measured characteristics have changed; and transmitting a signal corresponding to one of the subsequent original images, said signal comprising a sign image code of one of the subsequent original images, and the subsequent original image, said signal corresponding to one of the subsequent original images further including the modification parameters only if the one or more characteristics of the subsequent original image have changed.

19. A method of generating a synthesized signing image comprising the steps of:

storing a sign language database including a sign image corresponding to each of a plurality of speech segments and a sign image code corresponding to each sign image;

receiving a signal including an original image of a subject and a sign image code corresponding to a database sign image, and one or more modification parameters;

modifying the database sign image corresponding to the received sign image code based on the received one or more modification parameters;

superimposing the modified sign image on the original image of the subject to generate a synthesized signing image.

20. An encoding system for encoding a signal to facilitate the generation of a synthesized signing image at a remote location, comprising:

a memory storing a sign language database including a sign image corresponding to each of a plurality of speech segments;

a video input device for capturing an original image of a subject;

an audio input device for receiving speech from the subject;

a speech analyzer coupled to said audio input device, said speech analyzer identifying the database sign image corresponding to a received speech segment;

a processor coupled to said memory, said speech analyzer and said video input device, said processor calculating a modification parameter, said modification parameter indicating how a database sign image should be modified to match a characteristic of an original image;

a data encoder coupled to said processor, said encoder encoding a signal including an identification of a database sign image corresponding to a received speech segment, a modification parameter for the sign image, and a corresponding original image for transmission over a transmission medium to a remote location.

21. A decoding system for generating a synthesized signing image based on a received signal, said decoding system comprising:

a memory storing a sign language database including a sign image corresponding to each of a plurality of speech segments;

a data decoder receiving a signal via a transmission medium, said signal comprising an identification of a database sign image, a modification parameter for the sign image, and a corresponding original image of a subject;

an image processor coupled to the memory and the data decoder, said image processor modifying the database sign image identified in the received signal, said sign image being modified based on said received modification parameter, said image processor superimposing the modified sign image on the received original image;

a display coupled to the image processor, said display displaying a synthesized signing image of the modified sign image superimposed on the original image.

22. An apparatus for generating a synthesized signing image comprising the steps of:

means for storing a sign language database including a sign image corresponding to each of a plurality of speech segments;

means for obtaining an original image of a subject;

identifying a characteristic of the subject in the original image;

means for receiving a speech segment spoken by the subject;

means for identifying one of said database sign images corresponding to the speech segment spoken by the subject;

means for modifying the identified sign image to match the characteristic of the subject in the original image; and means for superimposing the modified sign image on the original image of the subject to generate a synthesized signing image.

* * * * *